United States Patent
Zima

(10) Patent No.: US 10,518,187 B2
(45) Date of Patent: Dec. 31, 2019

(54) LIGHTER THAN AIR HOVERING DRONE

(71) Applicant: Brian Zima, Upper Saddle River, NJ (US)

(72) Inventor: Brian Zima, Upper Saddle River, NJ (US)

( * ) Notice: Subject to any disclaimer, the term of this patent is extended or adjusted under 35 U.S.C. 154(b) by 326 days.

(21) Appl. No.: 15/665,405

(22) Filed: Jul. 31, 2017

(65) Prior Publication Data

US 2019/0030447 A1    Jan. 31, 2019

(51) Int. Cl.
| | | |
|---|---|---|
| *A63H 27/10* | (2006.01) | |
| *B64B 1/02* | (2006.01) | |
| *B64B 1/62* | (2006.01) | |
| *B64C 39/02* | (2006.01) | |
| *B64D 47/02* | (2006.01) | |
| *B64D 47/08* | (2006.01) | |

(52) U.S. Cl.
CPC ............... *A63H 27/10* (2013.01); *B64B 1/02* (2013.01); *B64B 1/62* (2013.01); *B64C 39/024* (2013.01); *B64D 47/02* (2013.01); *B64D 47/08* (2013.01); *A63H 2027/1008* (2013.01); *A63H 2027/1066* (2013.01); *B64C 2201/022* (2013.01); *B64C 2201/101* (2013.01); *B64C 2201/146* (2013.01)

(58) Field of Classification Search
CPC ........ A63H 27/00; A63H 27/02; A63H 27/10; A63H 2027/1041; A63H 2027/1008; A63H 2027/1058; A63H 2027/1075; A63H 2027/1066
USPC ................................................. 446/220-225
See application file for complete search history.

(56) References Cited

U.S. PATENT DOCUMENTS

| | | | | |
|---|---|---|---|---|
| 4,729,750 | A | * 3/1988 | Prusman | A63H 27/10 446/225 |
| 4,931,028 | A | 6/1990 | Jaeger et al. | |
| 5,149,015 | A | 9/1992 | Davis | |
| 5,429,542 | A | 7/1995 | Britt, Jr. | |
| 5,906,335 | A | * 5/1999 | Thompson | F02B 75/34 244/24 |
| 6,364,733 | B1 | * 4/2002 | Escauriza | A63H 27/10 446/225 |
| 6,520,824 | B1 | 2/2003 | Caroselli | |
| 7,055,777 | B2 | 6/2006 | Colting | |
| 8,303,367 | B2 | * 11/2012 | English | A63H 27/10 244/24 |
| 2008/0090487 | A1 | * 4/2008 | Randall | A63H 27/10 446/225 |
| 2008/0268742 | A1 | 10/2008 | Shenhar | |
| 2013/0035017 | A1 | 2/2013 | English | |

FOREIGN PATENT DOCUMENTS

CN              202295280              7/2012

* cited by examiner

*Primary Examiner* — Kien T Nguyen
(74) *Attorney, Agent, or Firm* — LaMorte + Associates, P.C.

(57) ABSTRACT

A lighter-than-air toy drone assembly that stays aloft using a balloon that is filled with a lighter-than-air gas. The balloon is inflated and deflated with the gas through a remote control vent valve. A ballast chamber can be provided that is filled with and drained of ballast through a purge valve. Controlled flight is achieved by selectively controlling motorized propellers, the vent valve and the optional purge valve. The motorized propeller provides horizontal movement. The purge valve and the vent valve change the buoyancy of the drone assembly and therefore control vertical movement.

18 Claims, 7 Drawing Sheets

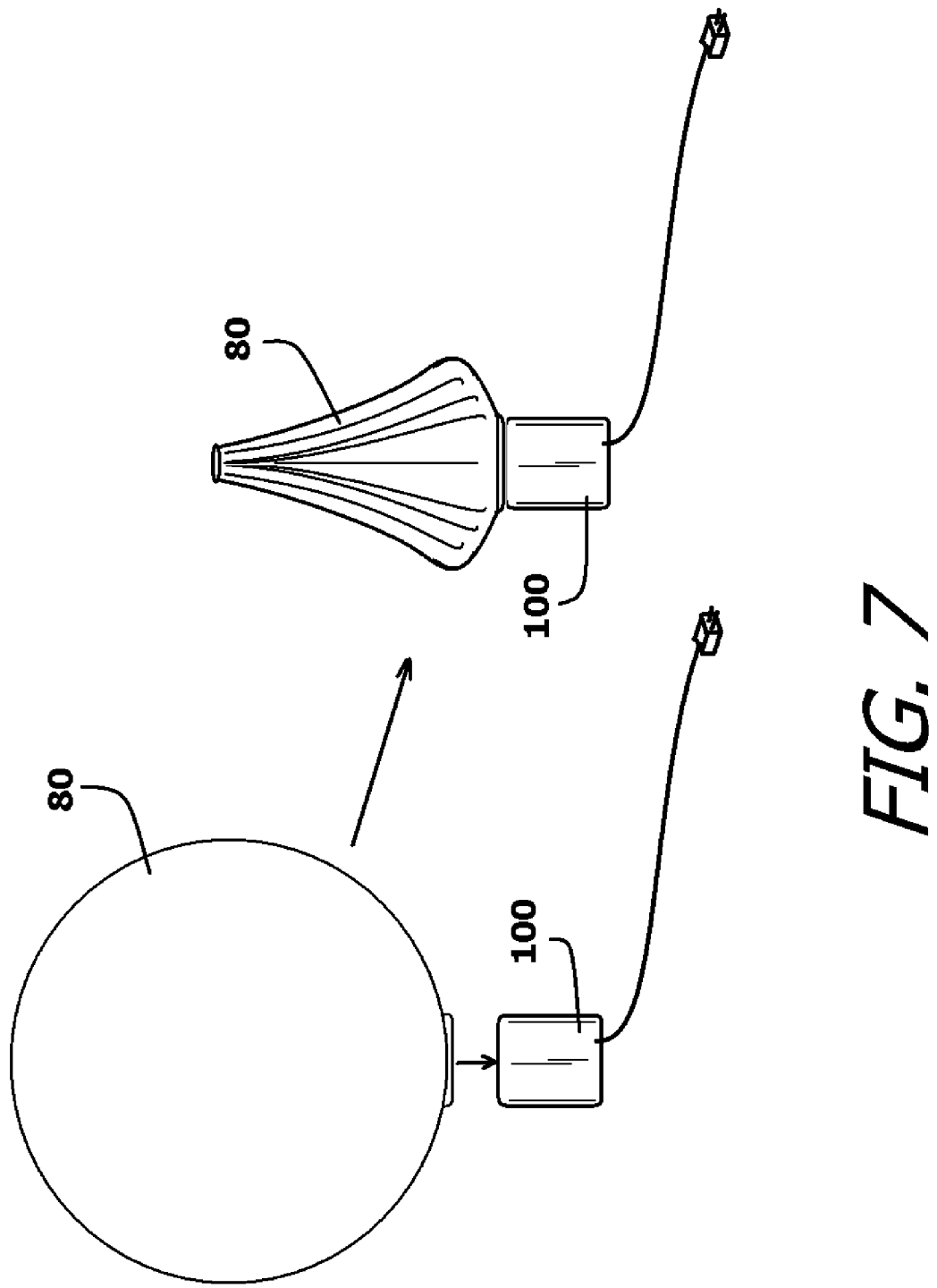

_US 10,518,187 B2_

LIGHTER THAN AIR HOVERING DRONE

BACKGROUND OF THE INVENTION

1. Field of the Invention

In general, the present invention relates to flying toys, such as toy drones. More particularly, the present invention relates to the structure of toy drones that are lighter-than-air and stay aloft due to buoyant forces.

2. Prior Art Description

Small flying toys in the form of toy helicopters and toy quadcopters are becoming increasingly popular in the marketplace. Such toys are known as toy drones in the industry. Toy drones are typically battery operated. The size and motor power of a drone determines the weight that the drone is capable of bringing into flight. As a consequence, small toy drones typically carry small batteries that can power the drone for only short periods of time. Furthermore, toy drones are typically provided with small plastic propellers that are unlikely to cause harm if contacted while spinning. Accordingly, most toy drones have batteries and blade configurations that are only capable of keeping them aloft for less than ten minutes before the batteries need to be recharged. A great need therefore exists in the industry for a small lightweight drone that is not dangerous to touch, yet is capable of staying aloft in flight for long periods of time.

One way to increase the ability of a toy drone to stay aloft is to decrease the buoyant weight of the toy drone in air. The less a drone weighs, the less power is required to keep it aloft. The less power that is required, the longer the batteries carried by the drone will last. In the prior art, there have been toy drones designed that are lighter-than-air. Such prior art is exemplified by U.S. Pat. No. 4,931,028 to Jager, entitled "Toy Blimp", and U.S. Pat. No. 5,429,542 to Britt, entitled "Helium Filled Remote Controlled Saucer Toy". These prior art drones use helium filled bodies to fly. Altitude and direction of flight are controlled by remotely controlled motors.

In U.S. Pat. No. 6,520,824 to Caroselli, entitled "Toy Balloon Vehicle", a control unit is disclosed that is designed to attach to one or more latex balloons that are filled with helium. As with the previously cited prior art, the control unit steers and propels the lighter-than-air construct.

One problem associated with lighter-than-air toys is that the altitude of the toy is very difficult to control. Lighter-than-air toys are very light and are easily moved by even a slight breeze or updraft. Furthermore, air density varies from point to point as does air temperature. All of these variables affect the altitude of a lighter-than-air toy. In all of the previously cited prior art, the battery powered motors are used to help control the altitude of the lighter-than-air toy. This causes the control motors on the toys to constantly run as they compensate for wind drift. The constant running of the control motors consumes battery power and diminishes the effective lime that the lighter-than-air toy can stay aloft.

In U.S. Pat. No. 5,149,015 to Davis, entitled "Radio Controlled Hot Air Balloon", a toy hot air balloon, commonly known as a Chinese lantern, is fitted with a controller. The controller selectively increases the size of a burning flame. This changes the temperature of the air within the balloon and the buoyancy of the balloon. This can help the toy rise if caught in a down draft. However, the control has a large time delay and can do nothing to compensate for an updraft.

A need therefore exists for an improved lighter-than-air drone, wherein rapid adjustments in altitude can be achieved without having to constantly run control propellers. In this manner, battery power is conserved and the lighter-than-air drone can be kept aloft in controlled flight for extended periods of time. This need is met by the present invention as described and claimed below.

SUMMARY OF THE INVENTION

The present invention is a lighter-than-air toy drone assembly that stays aloft using a balloon that is filled with a lighter-than-air gas. The balloon is inflated and deflated with the gas through a vent valve. An airframe is coupled to the balloon. The airframe supports the elements required to maintain controlled flight. Those elements include a battery and at least one motorized propeller powered by the battery. The motorized propeller, when powered by the battery, is capable of moving the air drone assembly horizontally in flight and turning the air drone assembly.

An optional ballast chamber can be supported by the airframe. The ballast chamber is filled and drained with ballast through a purge valve. Controlled flight is achieved by selectively controlling the motorized propeller, the vent valve, and the purge valve, if present. The motorized propeller provides horizontal movement. The vent valve and the optional purge valve can change the buoyancy of the drone assembly and therefore control vertical movement. These components are controlled by a controller that receives command signals and other input data through the personal area network of a remote smart phone.

The balloon of the drone assembly can be disposed within a spherical shell. When inflated, the spherical shell shapes the balloon into a mostly spherical shape. However, some gap spaces exist between the spherical shell and the balloon. The propulsion components of the drone assembly can be positioned within these gap spaces, therein providing the drone assembly with the appearance of a flying spherical orb.

BRIEF DESCRIPTION OF THE DRAWINGS

For a better understanding of the present invention, reference is made to the following description of exemplary embodiments thereof, considered in conjunction with the accompanying drawings, in which:

FIG. 7 shows the embodiment of the drone assembly of FIG. 6 shown both inflated and deflated with a base station.

DETAILED DESCRIPTION OF THE DRAWINGS

Although the present invention lighter-than-air drone can be embodied in many ways, only a few exemplary embodiments are illustrated and described. The exemplary embodiments are selected in order to set forth some of the best modes contemplated for the invention. The illustrated embodiments, however, are merely exemplary and should not be considered limitations when interpreting the scope of the appended claims.

Figure 1:
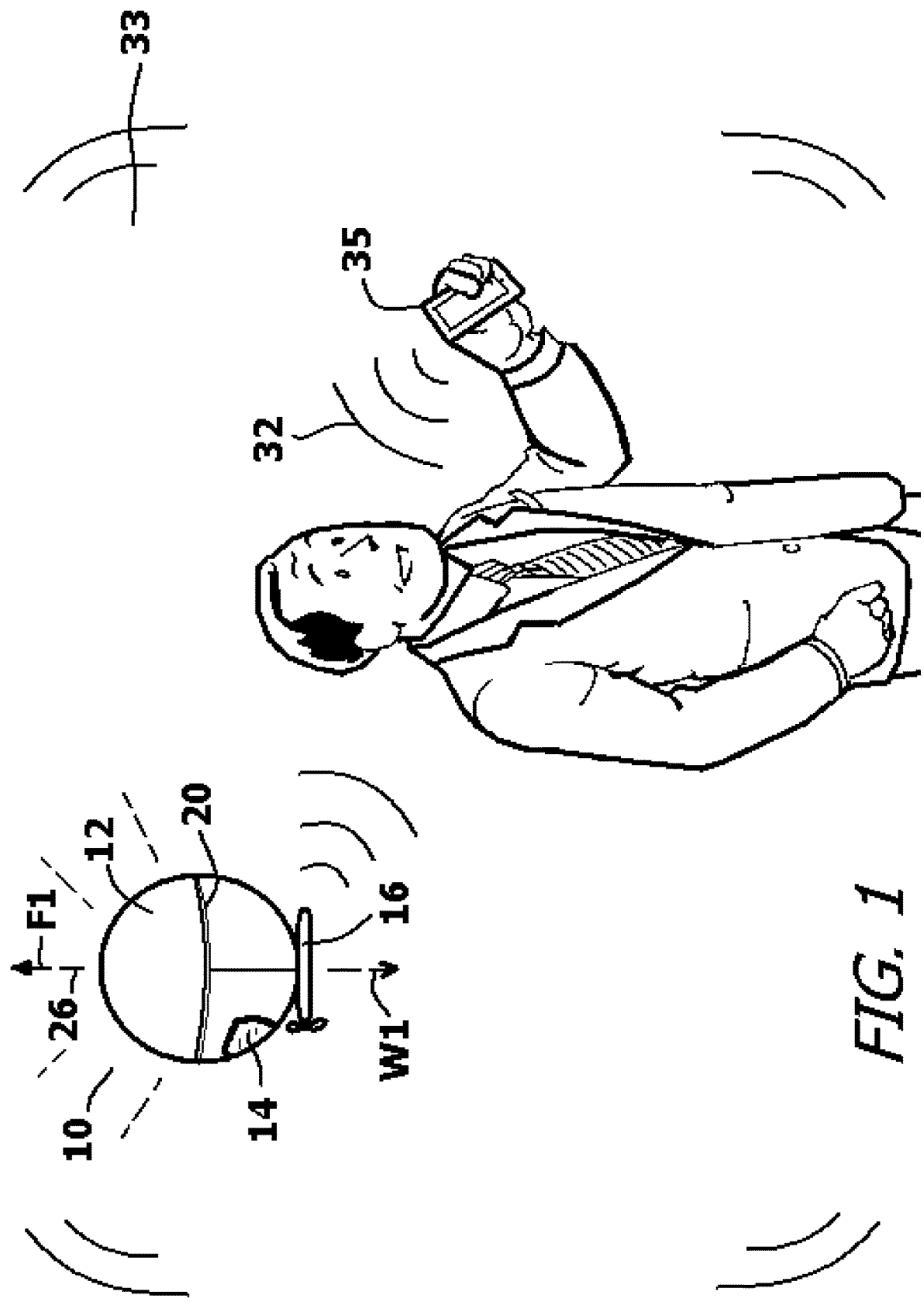
FIG. 1 is a perspective view of an exemplary embodiment of a toy drone assembly shown in conjunction with a user having a smart phone that generates a personal data network.
Figure 2:
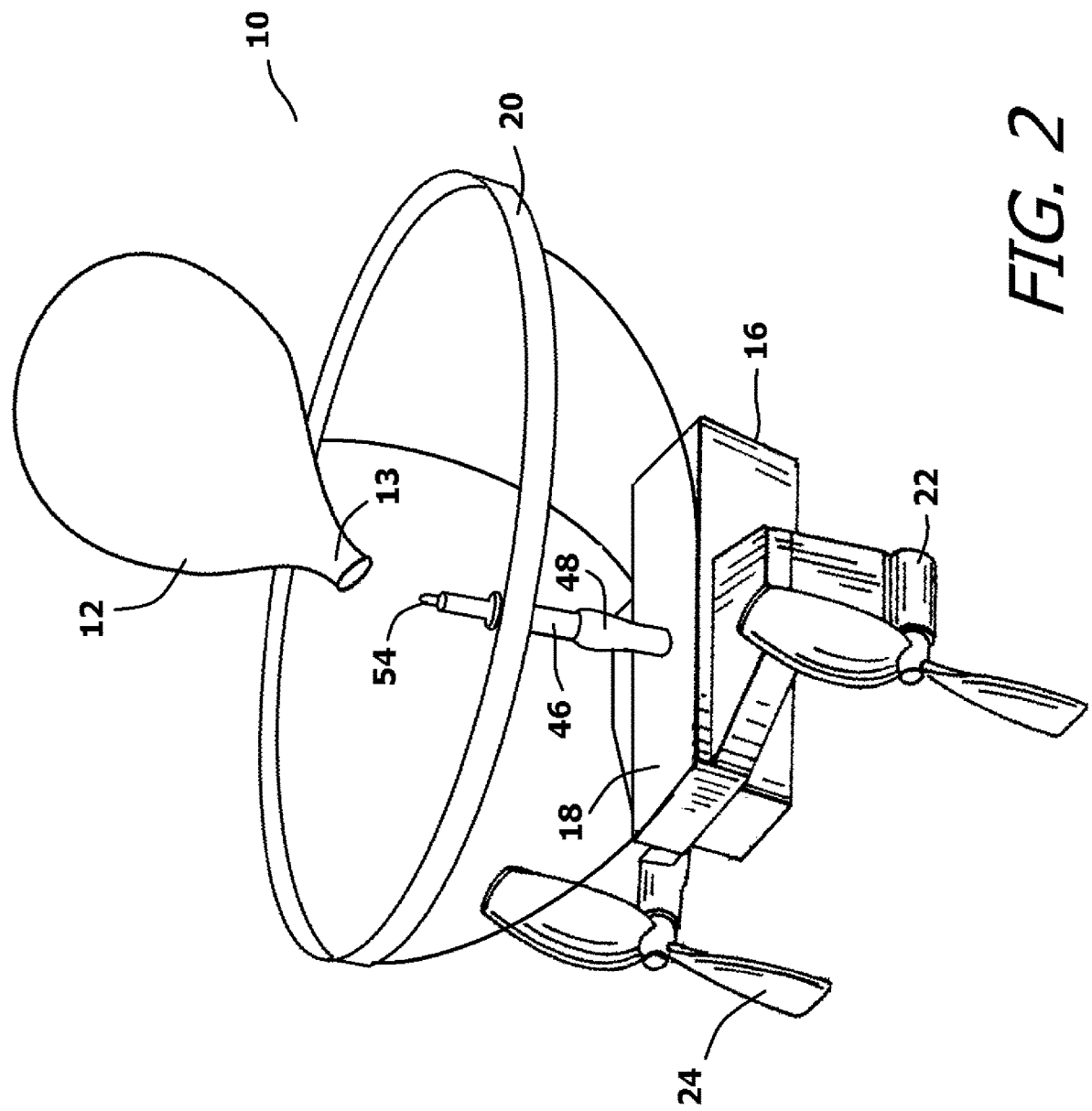
FIG. 2 is a perspective view of the airframe component of the exemplary toy drone assembly.

Referring to FIG. 1 and FIG. 2, a first embodiment of a lighter-than-air drone assembly 10 is shown. The drone assembly 10 includes a balloon 12 which is filled with a lighter-than-air gas 14, such as helium. The balloon 12 has a volume large enough to lift the remaining components of the drone assembly 10 into flight when filled with the lighter-than-air gas 14. As will be later detailed, the balloon 12 can be made from traditional toy balloon materials, such as latex or a polyester film. It is preferred that the balloon 12 be translucent to light so that it can be internally illuminated and appear to glow in low light conditions. It is also preferred that the balloon 12 be spherical when inflated. As such, the overall drone assembly 10 has the appearance of a floating, glowing orb when in flight.

The balloon 12 is mounted to an airframe 16. In the shown embodiment, the airframe 16 has a deck 18 and a retention ring 20 that is supported above the deck 18. The balloon 12 is inflated between the deck 18 and the retention ring 20. The retention ring 20 has a diameter that is smaller than the diameter of the inflated balloon 12. As such, the retention ring 20 confines the balloon 12 and prevents the balloon 12 from separating from the airframe 16 during high winds, sudden maneuvers, and/or crash landings. The retention ring 20 also transfers the lifting force of the balloon 12 to the remainder of the drone assembly 10.

In flight, the drone assembly 10 is neutrally buoyant in the ambient air and is able to maintain a selected altitude with little or no motorized assistance. As such, the drone assembly 10 can stay aloft, and in controlled flight, for long periods of time. As will later be explained, the drone assembly 10 carries flight controls and navigation controls that enable the drone assembly 10 to hover at a selected altitude above or near a person, and follow that person as the person moves. The drone assembly 10 has the ability to self compensate for changes in wind drafts and air density. Furthermore, the drone assembly 10 has the ability to automatically land should it be swept away in strong winds.

Figure 3:
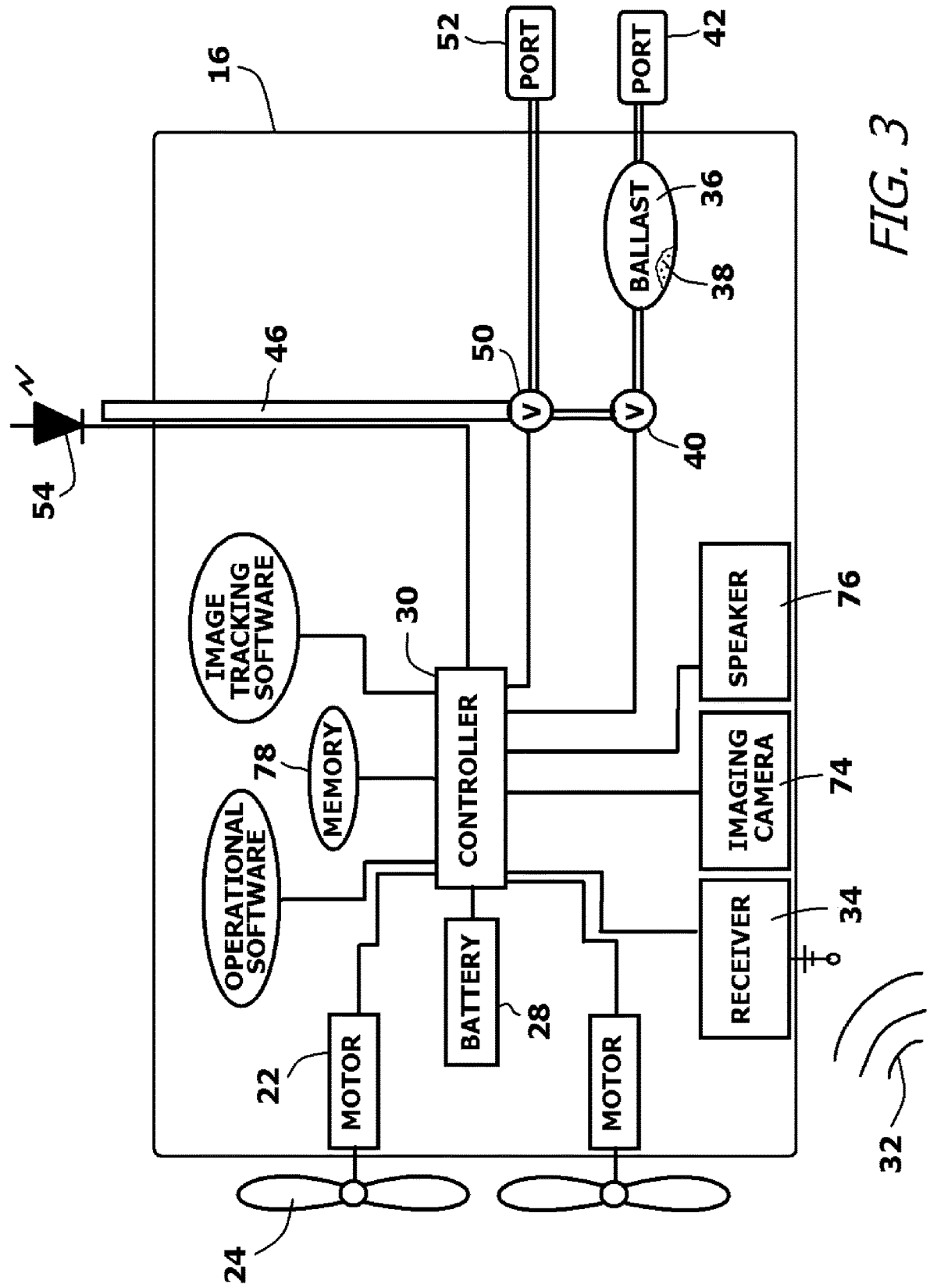
FIG. 3 is a schematic showing the control elements within the toy drone assembly.

Referring to FIG. 2 and FIG. 3 in conjunction with FIG. 1, it can be seen that the airframe 16 contains at least two propulsion motors 22 that are positioned on opposite sides of the airframe 16. The propulsion motors 22 are preferably reversible motors. The propulsion motors 22 turn propellers 24. The propulsion motors 22 can turn the propellers 24 individually or in unison. When operated in the same direction in unison, the propellers 24 can cause the drone assembly 10 to mover either forward or backward in the horizontal plane. When operated individually or in opposite directions, the propellers 24 can be used to turn the drone assembly 10 about the vertical mid-axis 26 of the drone assembly 10.

The propulsion motors 22 are symmetrically disposed about the mid-axis 26 of the drone assembly 10 to help maintain a balance of weight in flight. The propulsion motors 22 are powered by a rechargeable battery 28. The battery 28 is also symmetrically disposed about the mid-axis 26 of the drone assembly 10, to evenly distribute the weight.

The propulsion motors 22 are connected to a controller 30, which regulates the flow of electricity from the battery 28 to the propulsion motors 22. The controller 30, in turn, is controlled by incoming control signals 32. The controller 30 is coupled to a receiver 34, which can receive remotely broadcast control signals 32. The control signals 32 can be infrared control signals, laser light controls or even audio signals. However, in the preferred embodiment, the control signals 32 are localized radio signals that operate as a personal area network 33, such as a Bluetooth® personal area network generated from a smart phone 35. In this manner, a person can control the flight of the drone assembly 10, using only a smart phone 35. Furthermore, by measuring the strength of the personal area network 33 transmitted by a smart phone 35, the controller 30 in the drone assembly 10 can determine when a person transmitting the control signals 32 is in effective range or out of effective range.

The propulsion motors 22 control forward movement, reverse movement, and turning. In other words, the propulsion motors 22 control movements in the X-Y plane that are parallel to the ground. However, vertical movement in the vertical Z-plane does not rely solely on the propulsion motors 22 and propellers 24. Rather, the up and down movement in the vertical plane is controlled, at least in part, by changing the buoyant weight of the drone assembly 10.

The balloon 12, when fully inflated with a lighter-than-air gas 14, provides an upward buoyant force F1. The buoyant force F1 of the balloon 12 is opposed by the weight W1 of the airframe 16. If the buoyant force F1 is equal to the weight W1 of the airframe 16, then the drone assembly 10 has a neutral buoyancy and will float in a fixed position, unless affected by wind or another external force. The weight W1 of the airframe 16 is designed to be slightly less than the buoyant force F1 of the inflated balloon 12. As such, there is a net upward lifting force that is provided by the balloon 12. However, within the airframe 16 there is a ballast chamber 36. The ballast chamber 36 is designed to hold a small volume of ballast 38, such as water. The weight of the ballast 38 plus the weight of the airframe 16 is greater than the buoyancy force F1 created by the balloon 12. As such, when the ballast chamber 36 is filled, the overall drone assembly 10 is heavier than air.

In the airframe 16, the ballast chamber 36 is connected to a purge valve 40 at a ballast fill port 42. The purge valve 40 is controlled by the controller 30. Accordingly, the controller 30 can release ballast 38 from the ballast chamber 36 to cause the drone assembly 10 to become either neutrally buoyant or lighter-than-air. The preferred ballast 38 is a few cubic centimeters of water. In this manner, there is no danger should the ballast 38 be released onto a person. Furthermore, it is preferred that any ballast jettisoned is done so in a fine mist. In this manner, the ballast 38 should not drip from the drone assembly 10.

As is later explained, the balloon 12 is filled with gas 14 at a base station. The gas 14 is introduced through an elongated tube 46 that extends up from the center of the deck 18 of the airframe 16. The elongated tube 46 serves multiple functions. First, the elongated tube 46 serves as a structure that is capable of entering the neck 13 of the balloon 12. The neck 13 of the balloon 12 seals around the exterior of the elongated tube 46. There may be contoured shapes 48 on the exterior of the elongated tube 46 to help the neck 13 of the balloon 12 seal against the elongated tube 46.

The elongated tube 46 leads to a gas valve 50 at a vent port 52 that is controlled by the controller 30. The gas valve 50 enables gas 14 from an outside source to enter the elongated tube 46 and fill the balloon 12. The gas valve 50 also lets gas 14 from the balloon 12 to vent into the surrounding environment when the drone assembly 10 is in flight. As such, if a person wants the drone assembly 10 to lower its altitude, then the controller 30 may receive a control signal 32 that makes it operate the gas valve 50 and vent away a small volume of the gas 14 from the balloon 12. This decreases the buoyancy of the balloon 12, which causes a decrease in altitude.

The elongated tube 46 also supports a light source 54. When inflated, the light source 54 extends into the balloon 12 close to its geometric center. By positioning a light source 54 on the elongated tube 46, the light source 54 can be positioned near the geometric center of the balloon 12. The light source 50 is preferably a small matrix of LEDs that are capable of internally illuminating the balloon 12 in a variety of colors. Although the use of LEDs is preferred, small flash strobes can also be used. When activated, the light source 54 internally illuminates the balloon 12. The balloon 12 is translucent and the light can be perceived outside of the balloon 12, wherein the balloon 12 appears to internally glow or flash. The light source 54 is also selectively activated by the controller 30.

Figure 4:
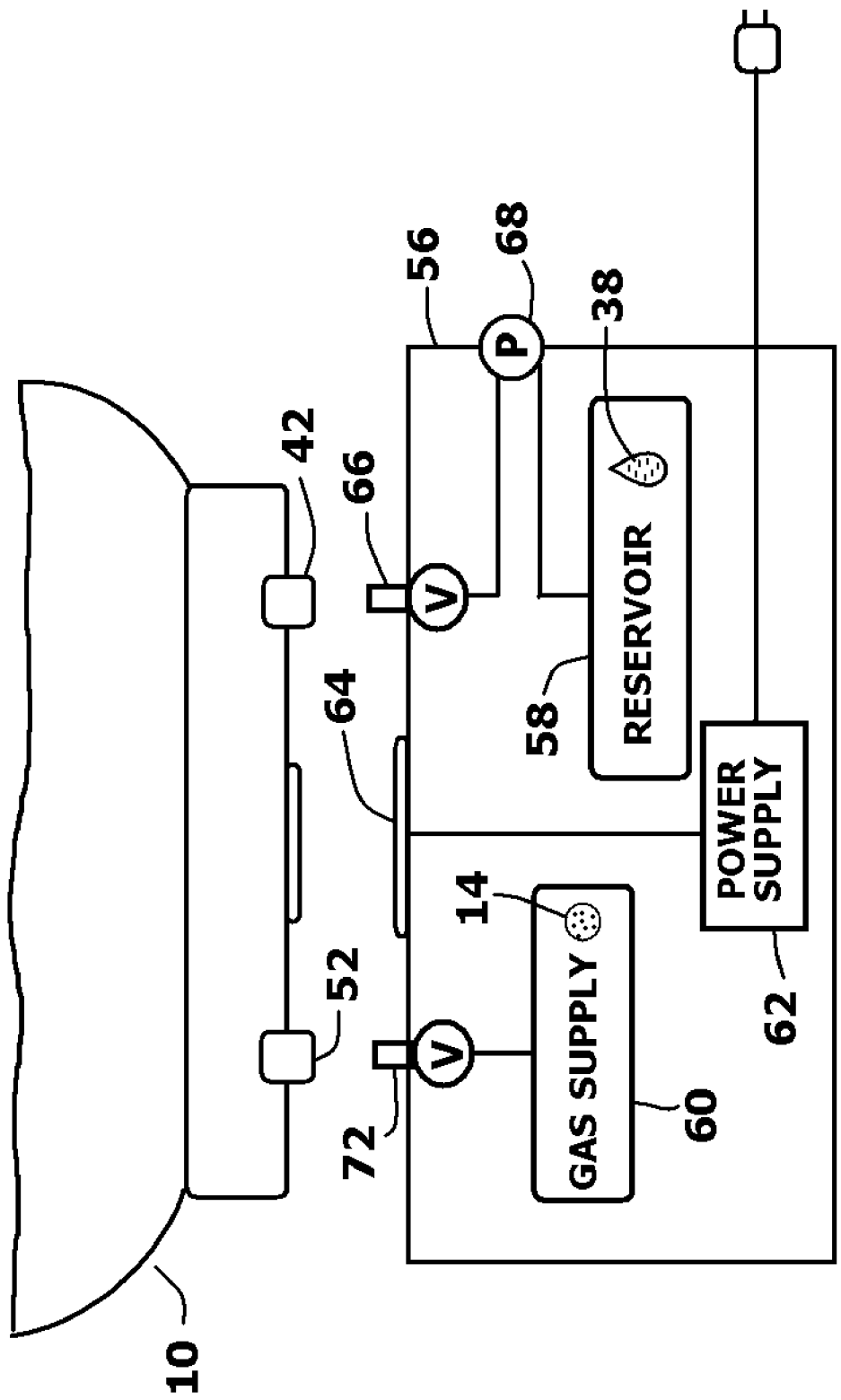
FIG. 4 shows the airframe component of the toy drone assembly engaging a base station.

Referring to FIG. 4, a base station 56 is shown for the drone assembly 10. The base station 56 contains a reservoir 58 for ballast 38, such as water. The base station 56 also contains a supply 60 of the lighter-than-air gas 14, such as helium. The supply 60 of lighter than air gas 14 can come in the form of replaceable cartridges. Lastly, the base station 56 contains an AC/DC converter 62 and a recharging port 64 to recharge the battery 28. When the drone assembly 10 is not flying, it can be connected to the base station 56. When connected to the base station 56, the battery 28 interconnects with the recharging port 64, therein enabling the battery 28 to recharge. Furthermore, when docked with the base station 56, the ballast fill port 42 engages a nipple valve 66 that connects the ballast fill port 42 to the ballast reservoir 58. A small manually operated pump 68 is provided that is operated by being pressed on the base station 56. The user presses the pump 68 to transfer the ballast 38 into the ballast chamber 36 on the drone assembly 10.

Additionally, when docked with the base station 56, the vent port 52 on the airframe 16 engages a nipple valve 70 that connects the vent port 52 to the gas supply 60. A fill valve 72 is provided on the base station 56. The user manually activates the fill valve 72 to inject the gas 14 into the balloon 12.

The drone assembly 10 carries other electronics. The other electronics include a camera 74, speakers 76 and a memory 78 capable of holding audio files and video files. When in flight, the drone assembly 10 is capable of recording video with the camera 74 and storing the video as a file in the memory 78. The video file can be downloaded when the drone assembly 10 is docked in the base station 56. Alternatively, the drone assembly 10 can be equipped with an optional transmitter (not shown) that enables the video files to be streamed to the smart phone 35 using the personal area network 33.

Audio files, such as music or sound effects, can be stored in the memory 78 and can be played by the drone assembly 10 when in flight. The audio files can be stored in the memory 78 or can be streamed to the drone assembly 10 using the personal area network 33. It will therefore be understood that music stored on the smart phone 35 can be transmitted to the drone assembly 10 while in the personal area network 33, wherein the drone assembly 10 will broadcast the music.

In flight, the electronics of the drone assembly 10 rely upon the personal area network 33 transmitted by the smart phone 35 for multiple functions. First, the person using the smart phone 35 can send specific flight instructions to the drone assembly 10, in the manner of a traditional remote control. As such, a person can steer the drone assembly 10 using the propulsion motors 22 and can control the altitude of the drone assembly 10 by changing its buoyancy.

The personal area network 33 can also be used for a variety of preprogrammed automatic functions. For example, if the radio signal received by the drone assembly 10 within the personal area network 33 becomes weaker than a predetermined threshold, it will be understood that the drone assembly 10 has traveled too far from the smart phone 35. In such a scenario, it may be assumed that the drone assembly 10 is being poorly piloted or has been overcome by strong winds. This would cause the drone assembly 10 to exit the personal area network 33 and no longer be capable of controlled flight. The controller 30 in the drone assembly 10 can be programmed with a subroutine that causes the vent port 52 to open and the drone assembly 10 immediately land as soon as it leaves the effective area of the personal area network 33.

The personal area network 33 generated by any smart phone 35 is coded and is unique to that smart phone 35. Signal coding enables the personal area networks of different people to overlap without interference. Signal coding also enables the personal area network 33 to operate as an electronic tether. That is, the drone assembly 10 can be programmed to hover at a set altitude near or around the person holding the smart phone 35 that is generating the personal area network 33. The drone assembly 10 can navigate using the signal strength of the personal area network 33 and maintaining a target object size in the image of the camera 74. Systems for creating a signal tether for a flying drone are exemplified by U.S. Pat. No. 9,367,067 to Gilmore, entitled "Digital Tethering For Tracking With Autonomous Ariel Robot", the disclosure of which is incorporated by reference.

Referring to FIG. 1 through FIG. 4, it will be understood that the drone assembly 10 is filled with gas 14 and ballast 38 on the base station 56. Likewise, the battery 28 on the drone assembly 10 is charged while the drone assembly 10 is connected to the base station 56. Once supplied and recharged, the drone assembly 10 is ready for flight. A person initiates a personal area network 33 using a smart phone 35 and synchronizes the drone assembly 10 to that personal area network 33. Flight instructions can be sent to the drone assembly 10. Alternatively, the drone assembly 10 can be instructed to run preprogrammed functions, such as to hover near the smart phone 35 that is producing the local area network 33. While hovering, the drone assembly 10 can be internally illuminated. Furthermore, the drone assembly 10 can broadcast sound effects and/or music. Should the drone assembly 10 be blown by the wind or otherwise move out of the range of the personal area network 33, then the balloon 12 of the drone assembly 10 will immediately deflate and the drone assembly 10 will land.

The drone assembly 10 can be kept aloft for many hours using only a small battery 28 and a limited charge. This is because the drone assembly 10 can vent ballast 38 and gas 14 to control its buoyancy in air so as to remain neutrally buoyant at a selected altitude. No power is wasted in staying loft. As such, power is only needed for lateral maneuvers and to operate the integrated electronics.

Figure 5:
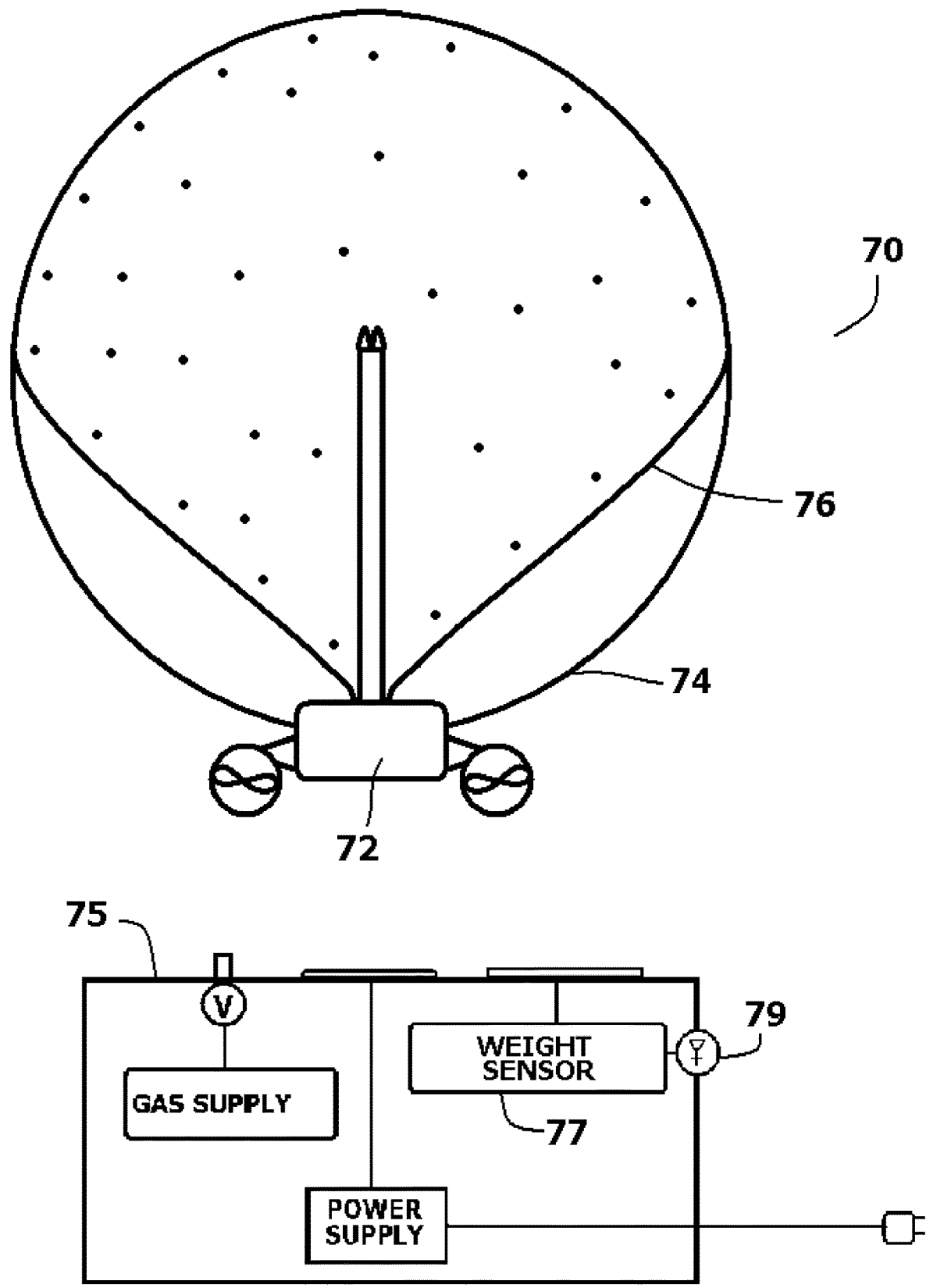
FIG. 5 shows an embodiment of the drone assembly that includes a spherical shell with external propulsion.

Referring to FIG. 5, an alternate embodiment of a drone assembly is 70 is shown. In this embodiment, an airframe 72 is provided that is much the same as the airframe of the previous embodiments. What is different is that a spherical shell 74 is attached to the airframe 72. The spherical shell 74 is preferably made of a lightweight material, such as plastic film. When fully expanded, the spherical shell 74 forms a sphere. A balloon 76 is placed inside the spherical shell 74.

When the balloon 76 is inflated, the balloon 76 fills the spherical shell 74. The spherical shell 74 ensures that the balloon 76 will inflate to be mostly circular and that the drone assembly 70 will have the appearance of a floating circular orb.

In the previous embodiments, the ability of the drone assembly 70 to rise up and down is, in part, controlled by the release of ballast. It will be understood that the need for ballast can be eliminated in a simpler form of the present invention. The balloon 76 of the drone assembly 70 can be inflated to the point where the drone assembly 70 is neutrally buoyant at ambient air pressure and temperature. Being neutrally buoyant, it takes the same amount of energy to move the drone assembly 70 up and down as it does to move the drone assembly 70 laterally. Accordingly, the drone assembly 70 can be moved up, down and laterally relying solely upon the power provided by the motorized propellers. Since the motorized propellers only need to run to implement course corrections, the drone assembly can stay aloft for many hours on battery power.

Figure 6:
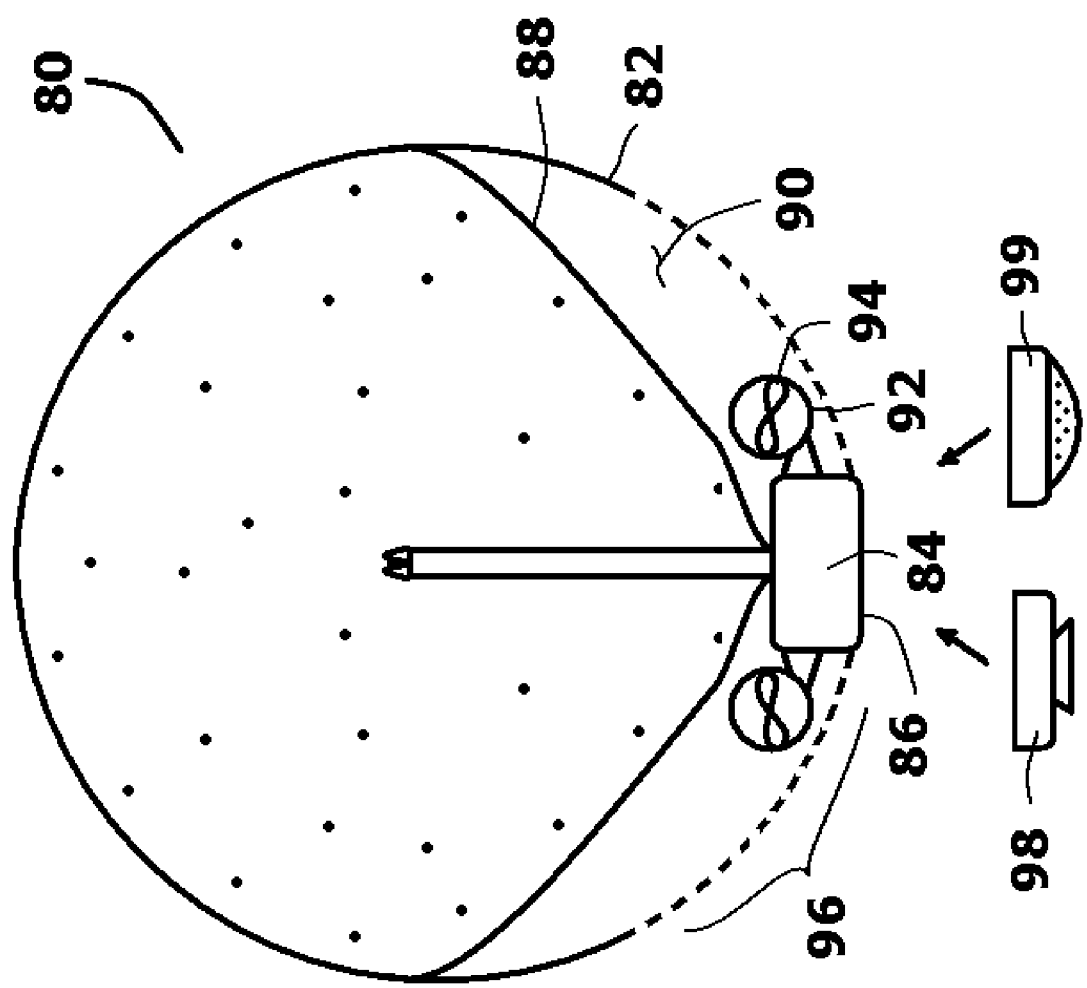
FIG. 6 shows an embodiment of the drone assembly that includes a spherical shell with internal propulsion.

The ability to vent the lighter-than-air gas is preferably preserved to rapidly land the drone assembly 70 should it lose control or be taken by the wind. To enhance the appearance of the drone assembly as a circular orb, the components of the airframe can be designed into the interior of the spherical shell. Such an embodiment is presented in FIG. 6. Referring to FIG. 6, it can be seen that a drone assembly 80 is provided where a spherical shell 82 is attached to a low profile airframe 84. The airframe 84 has a mounting plate 86 at its bottom. The spherical shell 82 is attached to the periphery of the mounting plate 86. As a result, when the spherical shell 82 is inflated, the drone assembly 80 has the appearance of a true spherical orb.

A balloon 88 is placed within the spherical shell 82. The balloon 88 has a traditional balloon shape and is not a pure sphere. As result, when the balloon 88 is inflated, there are gap spaces 90 between the spherical shell 82 and the balloon 88. Propulsion motors 92 and propellers 94 are positioned within the spherical shell 82 within the gap spaces 90. The spherical shell 82 has perforated areas 96 or areas fabricated from a mesh material proximate the propellers 94. As a result, the propellers 94 can move air and propel the drone assembly 80 without being directly observed.

Only a small portion of the mounting plate 86 extends out the bottom of the spherical shell 82. To reduce weight, features of the drone assembly 80 can be provided as modular attachments that can selectively attach to the drone assembly 80. The accessories can include a separate camera unit 98, a speaker unit 99, or another specialized electronic unit that the user wants to have airborne.

Referring lastly to FIG. 7, it can be seen that the drone assembly 80 can be set onto a base station 100. The base station 100 recharges and refills the drone assembly 80 in the manner previously described. If the drone assembly 80 is not going to be used, the drone assembly 80 can deflate while on the base station 100, therein becoming unobtrusive until again needed.

It will be understood that the embodiments of the present invention that are illustrated and described are merely exemplary and that a person skilled in the art can make many variations to those embodiments. For instance, the drone assembly can be made to have many different configurations. All such embodiments and configurations are intended to be included within the scope of the present invention as defined by the claims.

What is claimed is:

1. A lighter-than-air toy drone assembly comprising:
   a balloon that is inflated and deflated through a vent valve;
   an airframe coupled to said balloon;
   a ballast chamber supported by said airframe, wherein said ballast chamber is filled and drained through a purge valve;
   a battery supported by said airframe;
   at least one motorized propeller coupled to said airframe, wherein said at least one motorized propeller is powered by said battery and is capable of moving said toy drone assembly horizontally in flight;
   a controller supported by said airframe for selectively controlling said at least one motorized propeller, said purge valve, and said vent valve.

2. The toy drone assembly according to claim 1, wherein said controller responds to remote command signals transmitted from a remote source.

3. The toy drone assembly according to claim 2, wherein said remote command signals are generated by a smart phone and are transmitted through a personal area network.

4. The toy drone assembly according to claim 1, wherein said balloon is translucent and internally illuminated.

5. The toy drone assembly according to claim 1, further including a tube that extends from said airframe into said balloon, wherein said balloon is inflated and deflated through said tube and said vent valve controls gas flow through said tube.

6. The toy drone assembly according to claim 5, further including a light source supported by said tube within said balloon for internally illuminating said balloon.

7. The toy drone assembly according to claim 1, further including a speaker supported on said airframe.

8. The toy drone assembly according to claim 1, further including a camera supported by said airframe.

9. The toy drone assembly according to claim 1, wherein said balloon is spherical when inflated.

10. The toy drone assembly according to claim 1, further including a base station that connects to said airframe, wherein said base station has the ability to charge said battery and inflate said balloon when connected to said airframe.

11. The toy drone assembly according to claim 1, further including navigation software run on said controller that causes said toy drone assembly to hover in a personal area network generated by a remote smart phone.

12. The toy drone assembly according to claim 1, wherein said controller automatically opens said vent valve and deflates said balloon when said toy drone assembly flies outside a personal area network generated by a remote smart phone.

13. A lighter-than-air toy drone assembly comprising:
    a balloon filled with a volume of lighter-than-air gas;
    a vent valve for selectively venting said lighter-than-air gas from said balloon;
    an airframe coupled to said balloon;
    at least one motorized propeller coupled to said airframe for moving said air drone assembly horizontally in flight;
    a ballast chamber supported by said airframe, wherein said ballast chamber holds a volume of ballast;
    a purge valve for selectively releasing some of said volume of ballast from said ballast chamber;
    wherein said vent valve, said purge valve and said at least one motorized propeller are remotely controlled through a personal area network generated by a remote smart phone.

14. The toy drone assembly according to claim 13, wherein said balloon is translucent and internally illuminated.

15. The toy drone assembly according to claim 13, further including a tube that extends from said airframe into said balloon, wherein said balloon is inflated and deflated through said tube and said vent valve controls gas flow through said tube.

16. The toy drone assembly according to claim 15, further including a light source supported by said tube within said balloon for internally illuminating said balloon.

17. The toy drone assembly according to claim 13, further including a speaker supported on said airframe for broadcasting audio signals received through said personal area network.

18. A lighter-than-air toy drone assembly comprising:
- a balloon that is inflated and deflated through a vent valve;
- an airframe coupled to said balloon;
- a battery supported by said airframe;
- at least one motorized propeller coupled to said airframe, wherein said at least one motorized propeller is powered by said battery and is capable of moving said toy drone assembly horizontally in flight;
- a controller supported by said airframe for selectively controlling said at least one motorized propeller and said vent valve, wherein said controller automatically opens said vent valve and deflates said balloon when said toy drone assembly flies outside a personal area network generated by a remote smart phone.

\* \* \* \* \*